US012673530B2

(12) United States Patent
Kim et al.

(10) Patent No.: US 12,673,530 B2
(45) Date of Patent: Jul. 7, 2026

(54) THERMAL MANAGEMENT SYSTEM FOR VEHICLE

(71) Applicants: Hyundai Motor Company, Seoul (KR); Kia Corporation, Seoul (KR)

(72) Inventors: Ki Mok Kim, Busan (KR); Sang Shin Lee, Suwon-si (KR); Man Ju Oh, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 768 days.

(21) Appl. No.: 17/892,316

(22) Filed: Aug. 22, 2022

(65) Prior Publication Data

US 2023/0202258 A1    Jun. 29, 2023

(30) Foreign Application Priority Data

Dec. 24, 2021    (KR) ......................... 10-2021-0187542

(51) Int. Cl.
*B60H 1/00*                (2006.01)
(52) U.S. Cl.
CPC ..... *B60H 1/00642* (2013.01); *B60H 1/00278* (2013.01); *B60H 2001/00307* (2013.01)
(58) Field of Classification Search
CPC ...... B60H 1/00642; B60H 2001/00307; B60H 1/00278
See application file for complete search history.

(56) References Cited

U.S. PATENT DOCUMENTS

| | | | |
|---|---|---|---|
| 2019/0135075 A1* | 5/2019 | Hwang | ............. B60H 1/00278 |
| 2020/0269654 A1 | 8/2020 | Schroeder et al. | |
| 2020/0298663 A1 | 9/2020 | Allgaeuer et al. | |

FOREIGN PATENT DOCUMENTS

| | | |
|---|---|---|
| JP | 2012-158197 A | 8/2012 |
| KR | 10-1836272 B1 | 3/2018 |
| KR | 10-2019-0124032 A | 11/2019 |
| KR | 10-2020-0038032 A | 4/2020 |
| KR | 10-2021-0013425 A | 2/2021 |

* cited by examiner

*Primary Examiner* — Nael N Babaa
(74) *Attorney, Agent, or Firm* — Morgan, Lewis & Bockius LLP

(57)                ABSTRACT

A thermal management system for a vehicle, includes: a base refrigerant flow path provided sequentially with a compressor, a second expansion valve, an indoor condenser, a first expansion valve, an external condenser, and an evaporator and configured to flow a refrigerant in the base refrigerant flow path; a chiller refrigerant flow path branched off from the base refrigerant flow path at a downstream point of the external condenser, provided sequentially with a third expansion valve and an integrated chiller, and merged with the base refrigerant flow path at an upstream point of the compressor; and a parallel refrigerant flow path branched off from the base refrigerant flow path at an upstream point of the first expansion valve and merged with the chiller refrigerant flow path at an upstream point of the third expansion valve.

12 Claims, 13 Drawing Sheets

THERMAL MANAGEMENT SYSTEM FOR VEHICLE

CROSS REFERENCE TO RELATED APPLICATION

The present application claims priority to Korean Patent Application No. 10-2021-0187542, filed on Dec. 24, 2021, the entire contents of which is incorporated herein for all purposes by this reference.

BACKGROUND OF THE PRESENT DISCLOSURE

Field of the Present Disclosure

The present disclosure relates to a thermal management system for a vehicle, and more particularly, to a thermal management system for a vehicle, the system including a refrigerant cycle that absorbs waste heat of a battery or electric parts by use of an integrated chiller.

Description of Related Art

Recently, the number of registered eco-friendly vehicles in Korea is increasing due to a combination of a policy of expanding the supply of eco-friendly vehicles and consumer's preference for high-efficiency vehicles. An electric vehicle, which is an eco-friendly vehicle, is a vehicle that does not use petroleum fuel and an engine but operates by use of an electric battery and an electric motor. An electric vehicle has a system that drives a vehicle by rotating a motor with electricity accumulated in the battery, so there is no emission of harmful substances, low noise, and high energy efficiency.

For a vehicle using conventional engine power, an in-vehicle heating system is operated using waste heat of the engine, but an electric vehicle does not have an engine and thus requires a system that utilizes electricity to operate a heater. Accordingly, the electric vehicle has a problem in that the mileage during heating is greatly reduced.

Furthermore, a battery module needs to be used in an optimal temperature environment to maintain optimal performance and a long lifespan thereof. However, it is difficult to use in an optimal temperature environment due to heat generated during operation and external temperature change. To solve the present problem, a method for organically combining an air conditioning system and a thermal management system of an electric vehicle is being actively discussed.

FIG. 1 is a circuit diagram of a refrigerant cycle included in a thermal management system for a vehicle according to related art, and FIG. 2 is a P-h diagram of the refrigerant cycle included in the thermal management system for a vehicle according to the related art.

With reference to FIGS. 1 to 2, the refrigerant cycle applied to an air conditioning system of the vehicle includes an external condenser 10 provided outside the vehicle, wherein the external condenser 10 is connected in series with an integrated chiller 20 that absorbs waste heat from a battery or electric parts.

Therefore, when the amount of heat absorbed in the integrated chiller 20 connected in series with the external condenser 10 is increased, temperature and pressure of the entire refrigerant cycle rise. Thus the refrigerant temperature in the external condenser 10 becomes higher than temperature of external air, and the condenser 10 radiates heat to the outside air. Accordingly, there occurs a problem that the heat pump performance of the refrigerant cycle deteriorates.

To solve the present problem, a bypass flow path bypassing the external condenser 10 or a dehumidification flow path connecting directly from an upstream point of the external condenser 10 to an upstream point of the evaporator 30 is applied. However, this causes a cost increase and induces a problem that the amount of absorbed heat of the integrated chiller 20 according to a decrease in the flow rate of the refrigerant flowing into the integrated chiller 20 to be reduced to make it difficult to improve the heat pump performance.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a thermal management system for a vehicle, the system connecting an external condenser and an integrated chiller in parallel, facilitating the amount of waste heat absorbed in an integrated chiller to be increased.

In various aspects of the present disclosure, there may be provided a thermal management system for a vehicle, the system including: a base refrigerant flow path provided sequentially with a compressor, a second expansion valve, an indoor condenser, a first expansion valve, an external condenser, and an evaporator and configured to flow a refrigerant in the base refrigerant flow path; a chiller refrigerant flow path branched off from the base refrigerant flow path at a downstream point of the external condenser, provided sequentially with a third expansion valve and an integrated chiller, and merged with the base refrigerant flow path at an upstream point of the compressor; and a parallel refrigerant flow path branched off from the base refrigerant flow path at an upstream point of the first expansion valve and merged with the chiller refrigerant flow path at an upstream point of the third expansion valve.

The integrated chiller may be provided to be configured for exchanging heat at a same time with a coolant of a battery cooling flow path configured to cool a battery and a coolant of an electric part cooling flow path configured to cool electric parts.

The system may further include: a control valve, which is provided at a point where the chiller refrigerant flow path branches off from the base refrigerant flow path or the chiller refrigerant flow path merges with the base refrigerant flow path or is provided at a point where the parallel refrigerant flow path branches off from the base refrigerant flow path or merges with the base refrigerant flow path or the chiller refrigerant flow path and is configured to control the flow of the refrigerant; and a controller electrically connected to the control valve and configured to control the control valve so that the refrigerant of the base refrigerant flow path flows or is blocked to the chiller refrigerant flow path or the parallel refrigerant flow path or to control the first expansion valve, the second expansion valve, or the third expansion valve so that the incoming refrigerant flows, is blocked, or expands.

The control valve is a three-way valve which is provided at the point where the parallel refrigerant flow path merges with the chiller refrigerant flow path and is configured to control the flow of the refrigerant.

In an external air heat absorption and dehumidification mode, the controller may be configured to control the first expansion valve so that the refrigerant flowing into the upstream point of the external condenser expands and control the third expansion valve so that the refrigerant incoming to the integrated chiller is blocked.

In an electric part waste heat absorption mode, the controller may be configured to control the control valve so that the refrigerant of the base refrigerant flow path flows into the chiller refrigerant flow path through the parallel refrigerant flow path, control the first expansion valve or the second expansion valve so that the incoming refrigerant is blocked, and control the third expansion valve so that the refrigerant incoming to the upstream point of the integrated chiller expands.

In a waste heat absorption and dehumidification mode, the controller may be configured to control the control valve so that the refrigerant of the base refrigerant flow path flows into the chiller refrigerant flow path through the parallel refrigerant flow path, control the second expansion valve so that the refrigerant flowing into the evaporator expands, and control the third expansion valve so that the refrigerant flowing into the upstream point of the integrated chiller expands.

In a waste heat absorption and external air endothermic heating mode, the controller may be configured to control the control valve so that the refrigerant of the base refrigerant flow path, while flowing into the external condenser, flows into the chiller refrigerant flow path at a same time through the parallel refrigerant flow path, control the first expansion valve so that the refrigerant flowing into the external condenser expands, and control the third expansion valve so that the refrigerant flowing into the upstream point of the integrated chiller expands.

As described above, according to the thermal management system for a vehicle of the present disclosure, there is an effect that the amount of waste heat absorbed in the integrated chiller in the waste heat absorption mode is increased by connecting the external condenser and the integrated chiller in parallel.

Furthermore, there is an effect that heat radiation of the external condenser is prevented to secure the maximum performance of the heat pump.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a circuit diagram of a thermal management system for a vehicle according to various exemplary embodiments of the present disclosure;

FIG. 4, FIG. 5, FIG. 6 and FIG. 7 are circuit diagrams illustrating various control modes of the thermal management system for a vehicle according to various exemplary embodiments of the present disclosure;

FIG. 12 is a circuit diagram illustrating a waste heat absorption and dehumidification mode of the thermal management system for a vehicle according to various exemplary embodiments of the present disclosure; and FIG. 13 is a circuit diagram illustrating an electrical component waste heat absorption and external air endothermic heating mode of the thermal management system for a vehicle according to various exemplary embodiments of the present disclosure.

Figure 1:
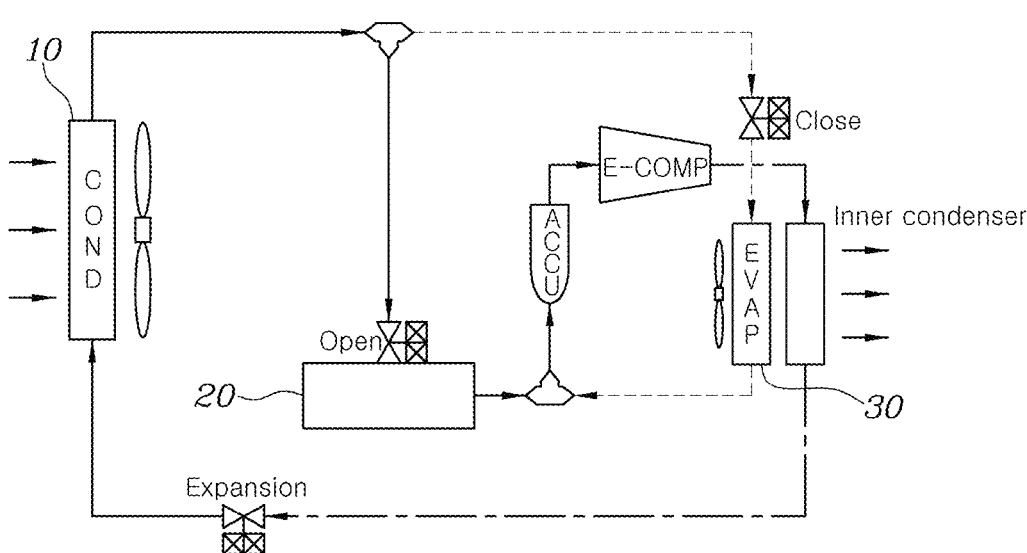
FIG. 1 is a circuit diagram of a refrigerant cycle included in a thermal management system for a vehicle according to a related art.
Figure 2:
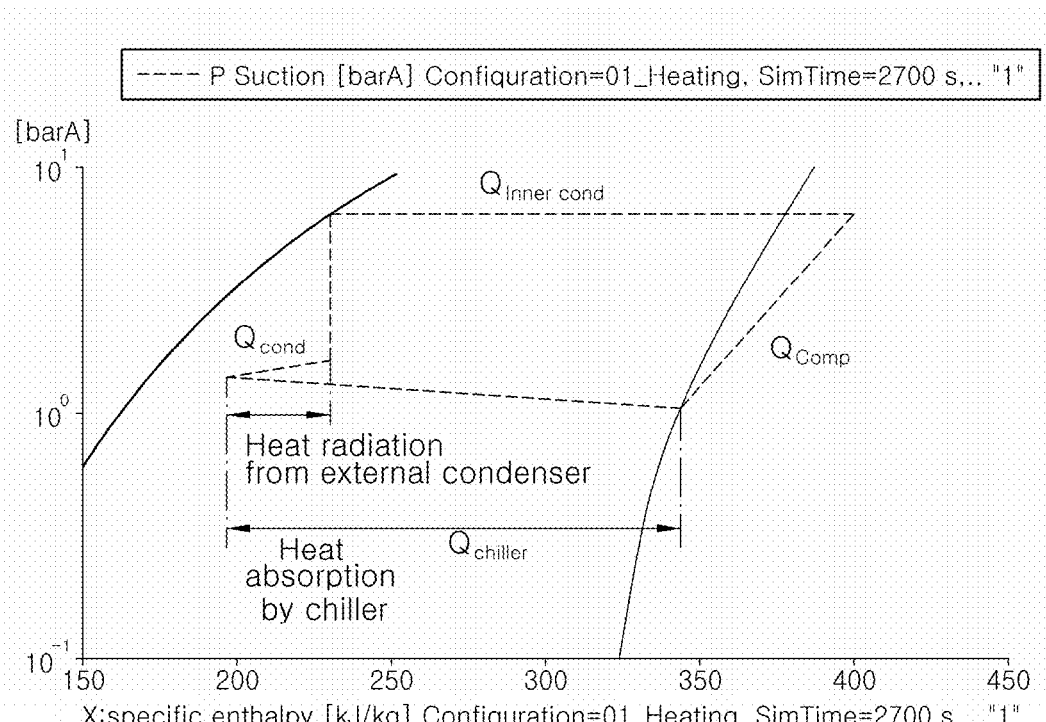
FIG. 2 is a P-h diagram of the refrigerant cycle included in the thermal management system for a vehicle according to the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the exemplary embodiments of the present disclosure disclosed in the exemplary embodiment or application are only exemplified for the purpose of describing the exemplary embodiments according to an exemplary embodiment of the present disclosure, and the exemplary embodiments of the present disclosure may be implemented in various forms and should not be construed as being limited to the exemplary embodiments described in the exemplary embodiment or application.

The exemplary embodiment of the present disclosure may have various changes and may have various forms, so specific embodiments are illustrated in the drawings and described in detail in the exemplary embodiment or application. However, this is not intended to limit the exemplary embodiment according to the concept of the present disclosure with respect to a specific disclosed form, and specific embodiments should be understood to include all changes, equivalents, or substitutes included in the spirit and scope of the present disclosure.

Terms such as first and/or second may be used to describe various elements, but the elements should not be limited by the terms. The above terms are used only for the purpose of distinguishing one element from another, for example, without departing from the scope of the present disclosure, a first element may be called a second element, and similarly, a second element may also be referred to as a first element.

When an element is referred to as being "connected" or "linked" to another element, it may be directly connected or linked to another element, but it should be understood that other elements may exist in the middle. On the other hand, when a certain element is referred to as being "directly connected" or "directly linked" to another element, it should be understood that no other element is present in the middle. Other expressions describing the relationship between elements, such as " . . . between" and "immediately . . . between", "neighboring to . . . " and "directly neighboring to . . . ", or the like should be interpreted similarly.

Terms used herein are used only to describe specific embodiments, and are not intended to limit the present disclosure. The singular expression includes the plural expression unless the context is clearly expressed otherwise. In the present specification, terms such as "includes" or "have" are intended to designate that a feature, number, step, operation, component, part, or a combination thereof that are described exists but should be understood that this does not preclude the possibility of addition or existence of one or more other features, numbers, steps, operations, components, parts, or combinations thereof.

Unless defined otherwise, all terms used herein, including technical and scientific terms, have the same meaning as commonly understood by one of ordinary skill in the art to which an exemplary embodiment of the present disclosure belongs.

Terms such as those defined in commonly used dictionaries should be interpreted as having meanings consistent with the context of the related art, and unless explicitly defined in the present specification, should not be interpreted in an ideal or excessively formal meaning.

Hereinbelow, various exemplary embodiments of the present disclosure will be described in detail with reference to the accompanying drawings. Throughout the drawings, the same reference numerals will refer to the same or like parts.

Figure 3:
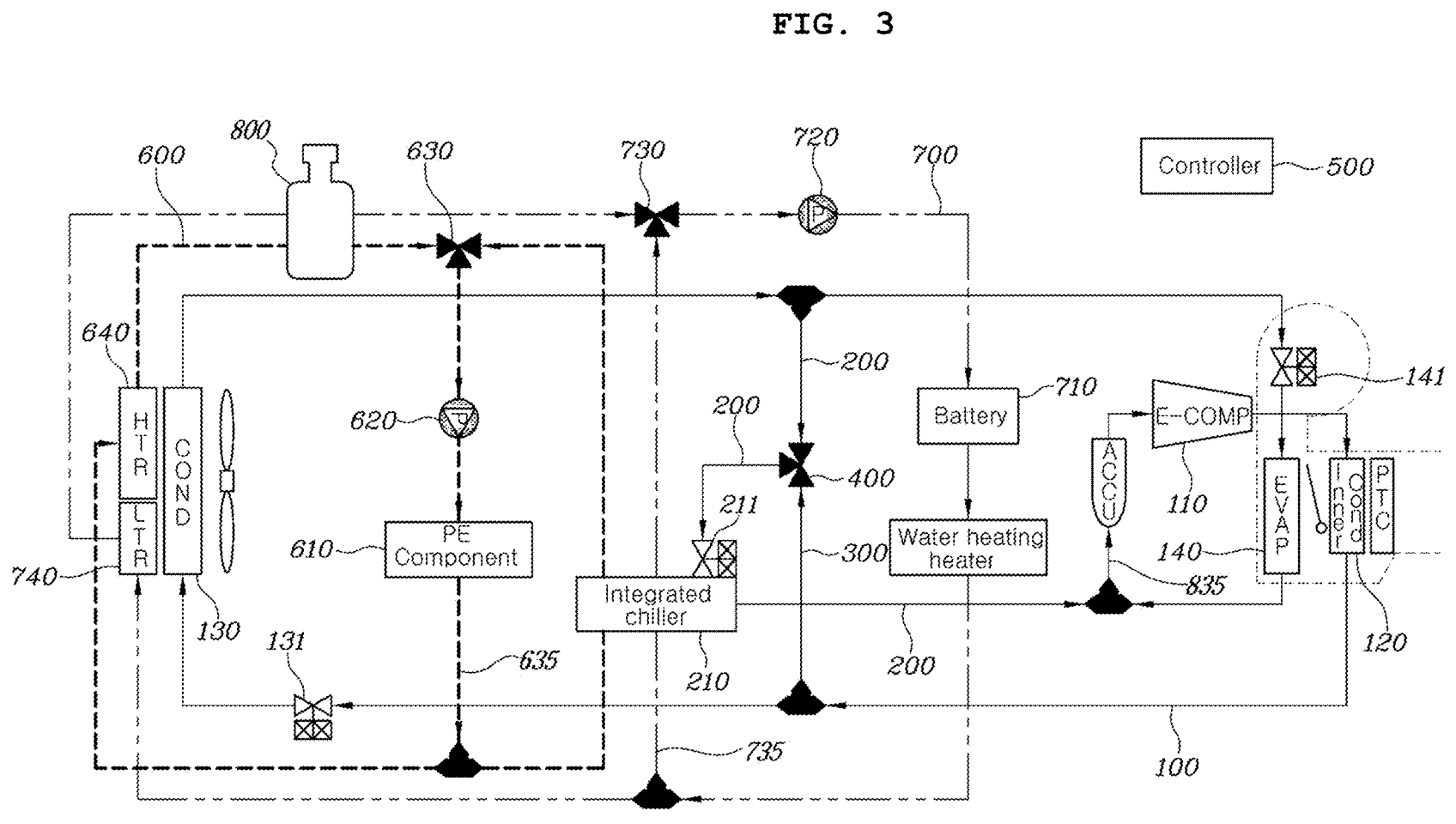

FIG. 3 is a circuit diagram of a thermal management system for a vehicle according to various exemplary embodiments of the present disclosure.

With reference to FIG. 3, the thermal management system for a vehicle according to various exemplary embodiments of the present disclosure includes: a base refrigerant flow path 100 provided sequentially with a compressor 110, a second expansion valve 141, an indoor condenser 120, a first expansion valve 131, an external condenser 130, and an evaporator 140 and configured to flow a refrigerant therein; a chiller refrigerant flow path 200 branched off from the base refrigerant flow path 100 at a downstream point of the external condenser 130, provided sequentially with a third expansion valve 211 and an integrated chiller 210, and merged with the base refrigerant flow path 100 at an upstream point of the compressor 110; and a parallel refrigerant flow path 300 branched off from the base refrigerant flow path 100 at an upstream point of the first expansion valve 131 and merged with the chiller refrigerant flow path 200 at an upstream point of the third expansion valve 211.

A base circuit is a refrigerant circuit in which the refrigerant is circulated, and may be a heat pump cycle (refrigeration cycle) sequentially provided with the compressor 110, the indoor condenser 120, the external condenser 130, and the evaporator 140.

Additionally, a gas-liquid separator is further provided at an upstream point of the compressor 110, and the refrigerant in a gas phase separated in the gas-liquid separator may be supplied to the compressor 110.

In the heat pump cycle, the high-temperature/high-pressure refrigerant compressed in the compressor 110 radiates heat at the indoor condenser 120 and the external condenser 130, passes through a heat absorption process while sequentially passing through the evaporator 140, and then is circulated back to the compressor 110. As the refrigerant expands in the first expansion valve 131 positioned at the upstream point of the external capacitor 130 or the second expansion valve 141 positioned at the upstream point of the evaporator 140, the refrigerant may absorb heat from the surrounding air in the external capacitor 130 or in the evaporator 140. Here, the indoor condenser 120 may be exposed to an air conditioning flow path for indoor heating of the vehicle.

The chiller refrigerant flow path 200 is a refrigerant line in which the refrigerant flows, and may be branched off from and then merged again with the base circuit. The chiller refrigerant flow path 200 may be branched off at a point downstream point of the external condenser 130 and then merged again with the base circuit at upstream of the compressor 110.

The chiller refrigerant flow path 200 is provided with an integrated chiller 210 so that the refrigerant flowing in the integrated chiller 210 may absorb waste heat of a battery 710 or electric parts 610. The third expansion valve 211 may be provided at an upstream point of the integrated chiller 210 to expand the refrigerant flowing into the integrated chiller 210.

The parallel refrigerant flow path 300 is a refrigerant line branched off from the base refrigerant flow path 100 and merged with the chiller refrigerant flow path 200, and the refrigerant branched off from the base refrigerant flow path 100 may be merged with the base refrigerant flow path 100 again through the parallel refrigerant flow path 300 and the chiller refrigerant flow path 200. The parallel refrigerant flow path 300 may be branched off between the indoor condenser 120 and the first expansion valve 131 and may be merged with the chiller refrigerant flow path 200 at an upstream point of the integrated chiller 210 and the third expansion valve 211.

That is, the external condenser 130 provided in the base refrigerant flow path and the integrated chiller 210 provided in the chiller refrigerant flow path 200 merged with the parallel refrigerant flow path 300 have a structure connected in parallel, and accordingly, it may be controlled so that the refrigerant discharged from the compressor 110 is separated into the external condenser 130 and the integrated chiller 210.

In an exemplary embodiment of the present invention, a first bypass path 835 is connected between a portion of the chiller refrigerant flow path 200 and a portion of the base refrigerant flow path 100 bypassing the evaporator 110.

The integrated chiller 210 may be provided to be configured for exchanging heat at the same time with a coolant of a battery cooling flow path 700 configured to cool the battery 710 and a coolant of an electric part cooling flow path 600 configured to cool the electric parts 610.

The battery cooling flow path 700 is a coolant line in which the coolant exchanging heat with the battery 710 is circulated and may further include a battery valve 730 configured to control the coolant passing through the battery 710 to selectively flow to a battery radiator 740 or the integrated chiller 210 through a second bypass path 735.

In an exemplary embodiment of the present invention, the second bypass path 735 is connected to the battery valve 730 and a portion of the battery cooling flow path 700.

Furthermore, the electric part cooling path 600 is a coolant line in which the coolant exchanging heat with the electric parts 610 is circulated and may further include an electric part valve 630 configured to control the coolant passing through the electric parts 610 to selectively flow to the electric part radiator 640 through a third bypass path 635 or the integrated chiller 210.

In an exemplary embodiment of the present invention, the third bypass path 635 is connected to the electric part valve 630 and a portion of the electric part cooling path 600.

In an exemplary embodiment of the present invention, a coolant storage tank 800 may be connected to the electric part cooling path 600 and the battery cooling flow path 700.

That is, the integrated chiller 210 may be a device provided to enable the refrigerant flowing into the chiller refrigerant flow path 200 to exchange heat at the same time with coolants in the battery cooling path 700 and the electric part cooling path 600.

The system may further include: a control valve 400, which is provided at a point where the chiller refrigerant flow path 200 branches off from the base refrigerant flow path 100 or the chiller refrigerant flow path 200 merges with the base refrigerant flow path 100 or is provided at a point where the parallel refrigerant flow path 300 branches off from the base refrigerant flow path 100 or merges with the base refrigerant flow path 100 or the chiller refrigerant flow path 200 and is configured to control the flow of the refrigerant; and a controller 500 configured to control the control valve 400 so that the refrigerant of the base refrigerant flow path 100 flows or is blocked to the chiller refrigerant flow path 200 or the parallel refrigerant flow path 300 or to control the first expansion valve 131, the second expansion valve 141, or the third expansion valve 211 so that the incoming refrigerant flows, is blocked, or expands.

In an exemplary embodiment of the present disclosure, the control valve 400 may be located at a point where the chiller refrigerant flow path 200 branches off from the base refrigerant flow path 100 or the chiller refrigerant flow path 200 merges with the base refrigerant flow path 100, controlling the refrigerant flowing from the base refrigerant flow path 100 to the chiller refrigerant flow path 200 or may be located at a point where the parallel refrigerant flow path 300 branches off from the base refrigerant flow path 100 or the parallel refrigerant flow path 300 merges with the base refrigerant flow path 100, controlling the refrigerant flowing from the base refrigerant flow path 100 to the parallel refrigerant flow path 300.

In another exemplary embodiment of the present disclosure, as shown, the control valve 400 may be a three-way valve which is provided at the point where the parallel refrigerant flow path 300 merges with the chiller refrigerant flow path 200 and is configured to control the flow of the refrigerant. That is, the control valve 400 may allow the refrigerant flowing in through the parallel refrigerant flow path 300 branched off from the base refrigerant flow 100 at the upstream point of the external condenser 130 and the refrigerant flowing in through the chiller refrigerant flow path branched off from the base refrigerant flow 100 at the downstream point of the external condenser 130 to selectively flow into the integrated chiller 210.

The controller 500 according to various exemplary embodiments of the present disclosure may be implemented through a processor, which is configured to perform operations described below using a non-volatile memory and data stored in the corresponding memory, wherein the non-volatile memory is configured to store an algorithm configured to control the operations of various components of a vehicle or data related to software instructions configured to reproduce the algorithm. Here, the memory and the processor may be implemented as individual chips. Alternatively, the memory and processor may be implemented as a single chip integrated with each other. The processor may be provided in a form of one or more processors.

The controller 500 may control the control valve 400 so that the refrigerant of the base refrigerant flow path 100 flows or is blocked to the chiller refrigerant flow path 200 at the downstream point of the external condenser 130.

Furthermore, the controller 500 may control the first expansion valve 131 so that the flow of the refrigerant flowing into the upstream point of the external condenser 130 is allowed, is blocked, or expands, control the second expansion valve 141 so that the flow of the refrigerant flowing into the upstream point of the evaporator 140 is allowed, is blocked, or expands, and control the third expansion valve 211 so that the flow of the refrigerant flowing into the upstream point of the integrated chiller 210 is allowed, is blocked, or expands.

FIG. 4, FIG. 5, FIG. 6 and FIG. 7 are circuit diagrams illustrating various control modes of the thermal management system for a vehicle according to the exemplary embodiment of the present disclosure.

With further reference to FIG. 4, FIG. 5, FIG. 6, and FIG. 7, the thermal management system for a vehicle according to the exemplary embodiment of the present disclosure may implement an electric part cooling mode, a battery-radiator cooling mode, a battery-chiller cooling mode, and an indoor cooling mode.

Figure 4:
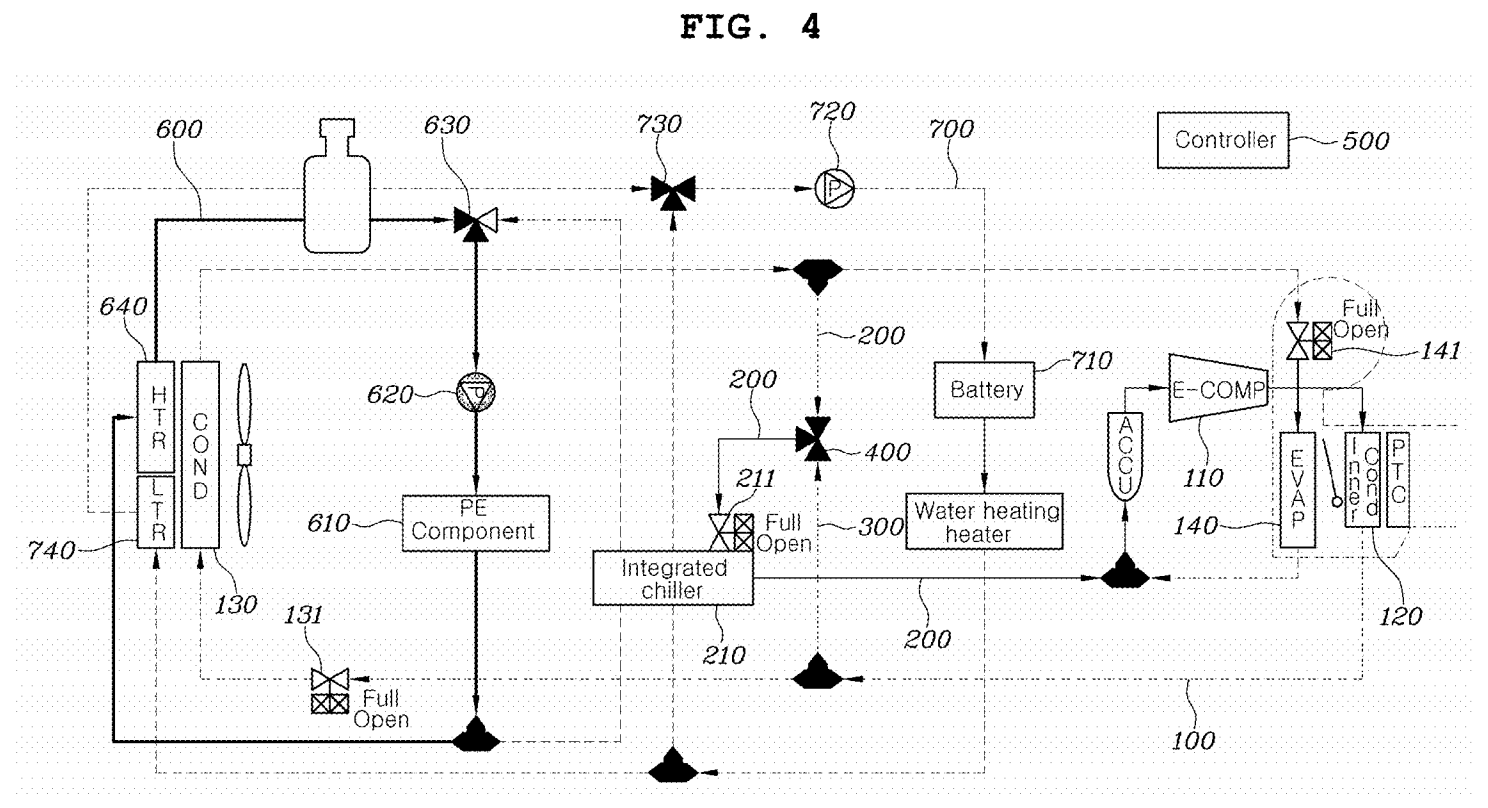

As shown in FIG. 4, while controlling the electric part valve 630 so that the coolant that has passed through the electric parts 610 flows into the electric part radiator 640 in the electric part cooling mode, the controller 500 may control to drive an electric pump 620 at a same time so that the coolant is circulated in the electric part cooling flow path 600.

Figure 5:
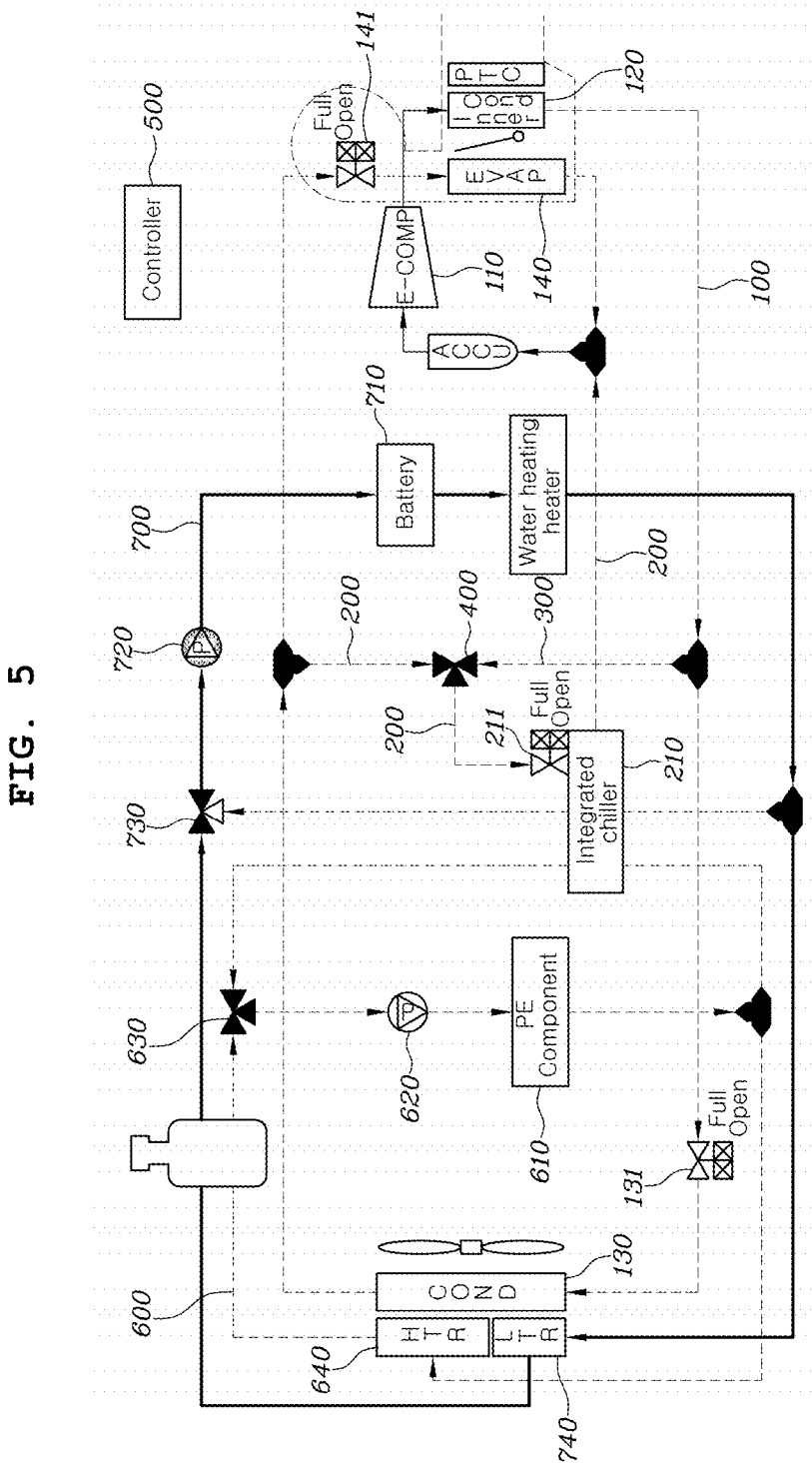

Furthermore, as shown in FIG. 5, while controlling the battery valve 730 so that the coolant that has passed through the battery 710 flows into the battery radiator 740 in the battery-radiator cooling mode, the controller 500 may control to drive a battery pump 720 at the same time so that the coolant is circulated in the battery cooling flow path 700.

Figure 6:
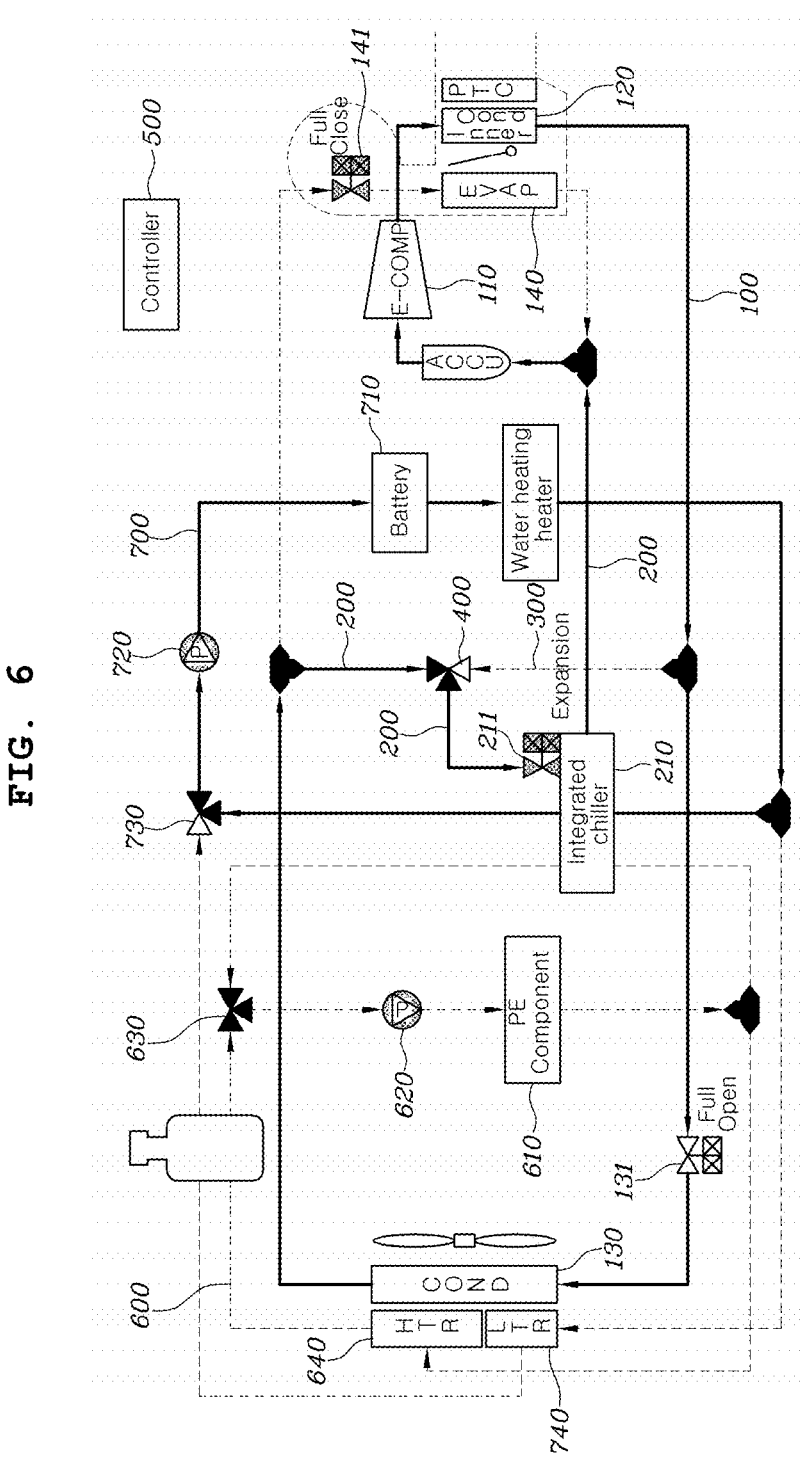

As shown in FIG. 6, while controlling the battery valve 730 so that the coolant that has passed through the battery 710 flows into the integrated chiller 210 in the battery-chiller cooling mode, the controller 500 may control to drive the battery pump 720 at the same time so that the coolant is circulated in the battery cooling flow path 700.

At the same time, the controller 500 may control the compressor 110 to drive, circulating the refrigerant to the base refrigerant flow path 100, and may control the first expansion valve 131 to be in full open, and at the same time, the control valve 400 so that the coolant flows into the integrated chiller 210 at a downstream point of the external condenser 130. Furthermore, to cool the coolant of the battery cooling flow path 700 in the integrated chiller 210, the controller 500 may control so that the third expansion valve 211 located at an upstream point of the integrated chiller 210 expands the refrigerant introduced therein.

Figure 7:
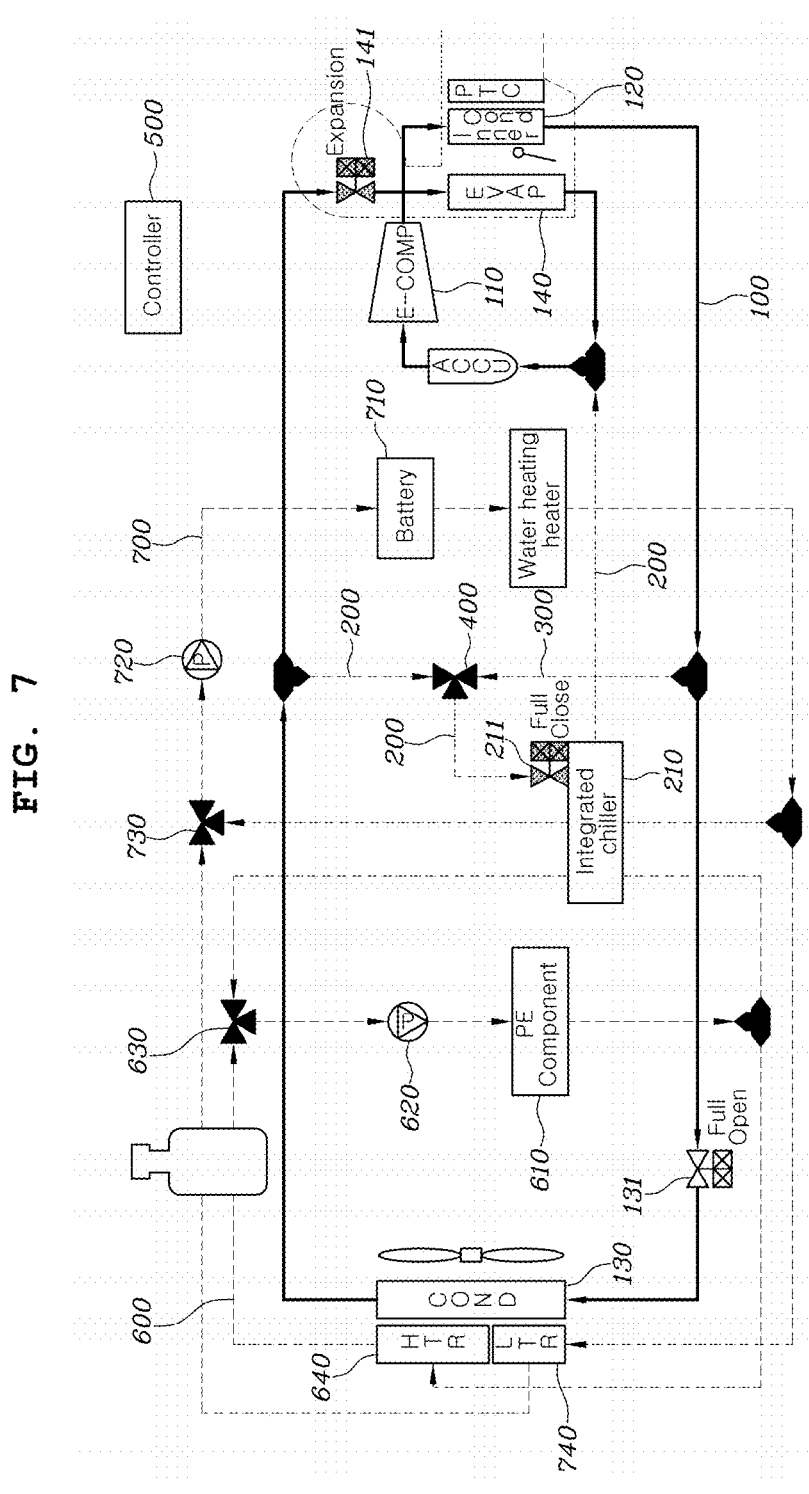

As shown in FIG. 7, in the indoor cooling mode, the controller 500 may control the compressor 110 to drive, circulating the refrigerant to the base refrigerant flow path 100, and may control the first expansion valve 131 to be in full open, and at the same time, the second expansion valve 141 to expand the refrigerant introduced into an upstream point of the evaporator 140. Additionally, the controller 500 may control the third expansion valve 211 to prevent the refrigerant from flowing so that the refrigerant does not flow into the chiller refrigerant flow path 200.

The, the thermal management system for a vehicle according to an exemplary embodiment of the present disclosure may be controlled in a control mode in which two or more of the electric part cooling mode, the battery-radiator cooling mode, the battery-chiller cooling mode, the indoor cooling mode, and the like are combined.

Figure 8:
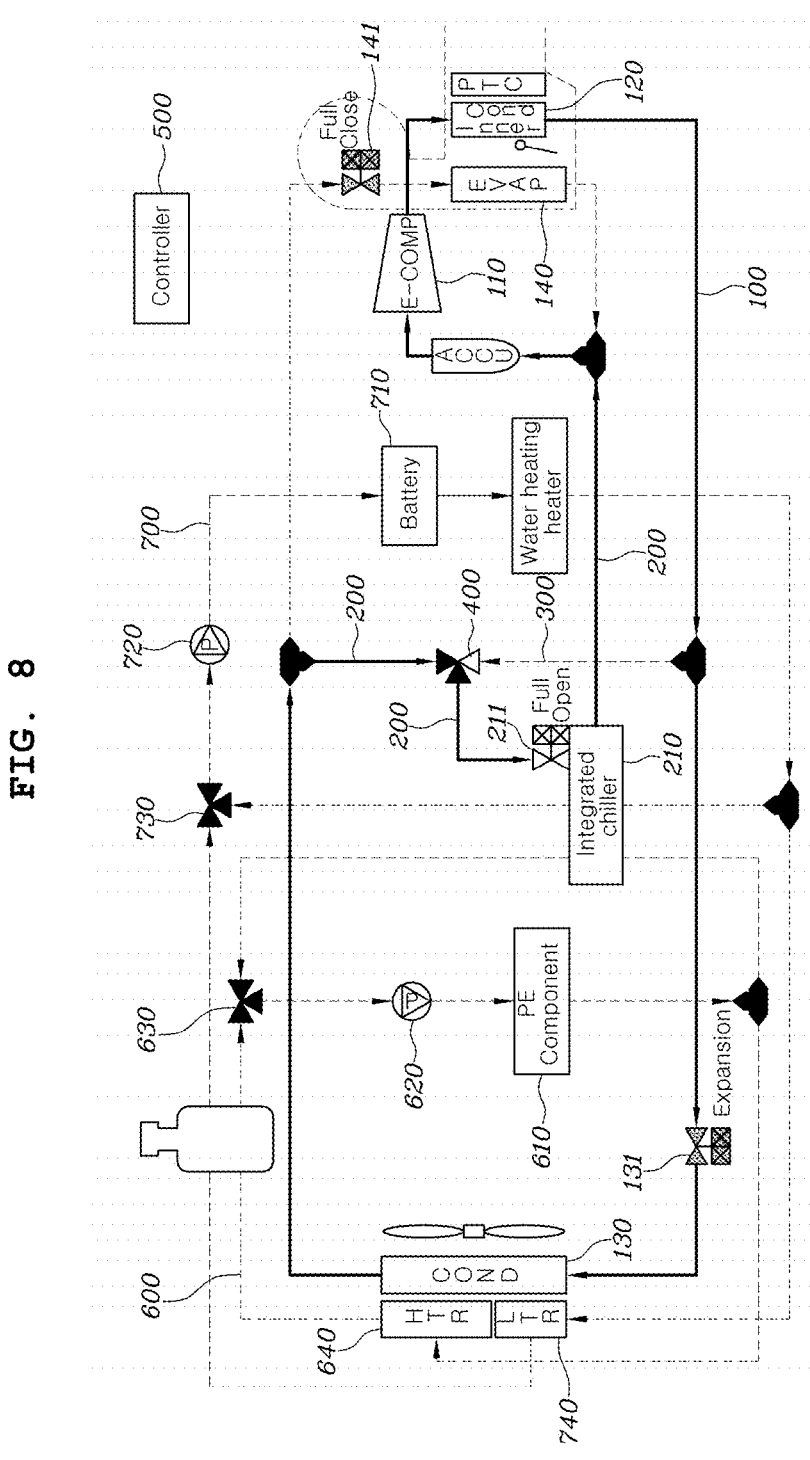
FIG. 8, FIG. 9 and FIG. 10 are circuit diagrams illustrating a heating control mode of the thermal management system for a vehicle according to various exemplary embodiments of the present disclosure.
Figure 9:
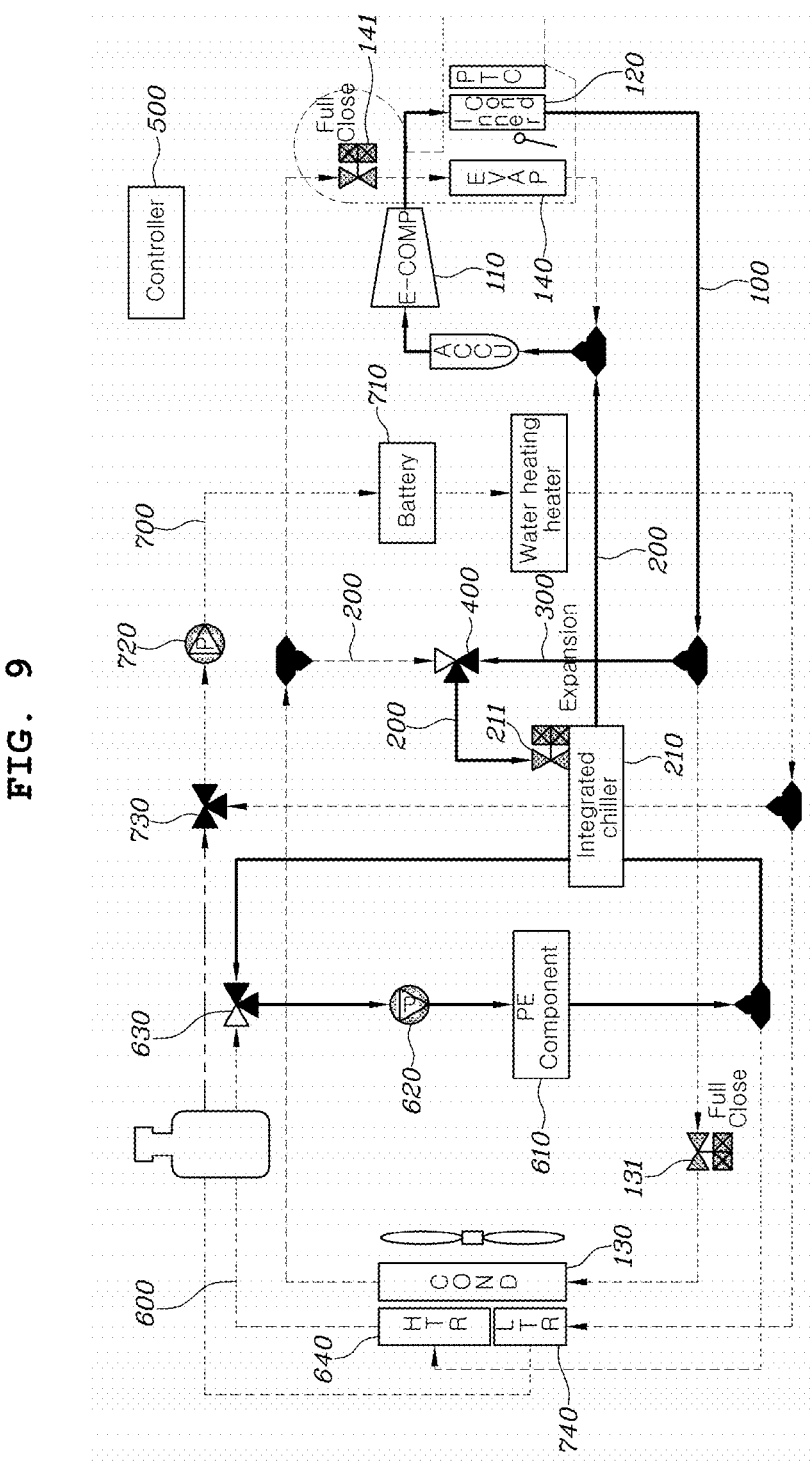
Figure 10:
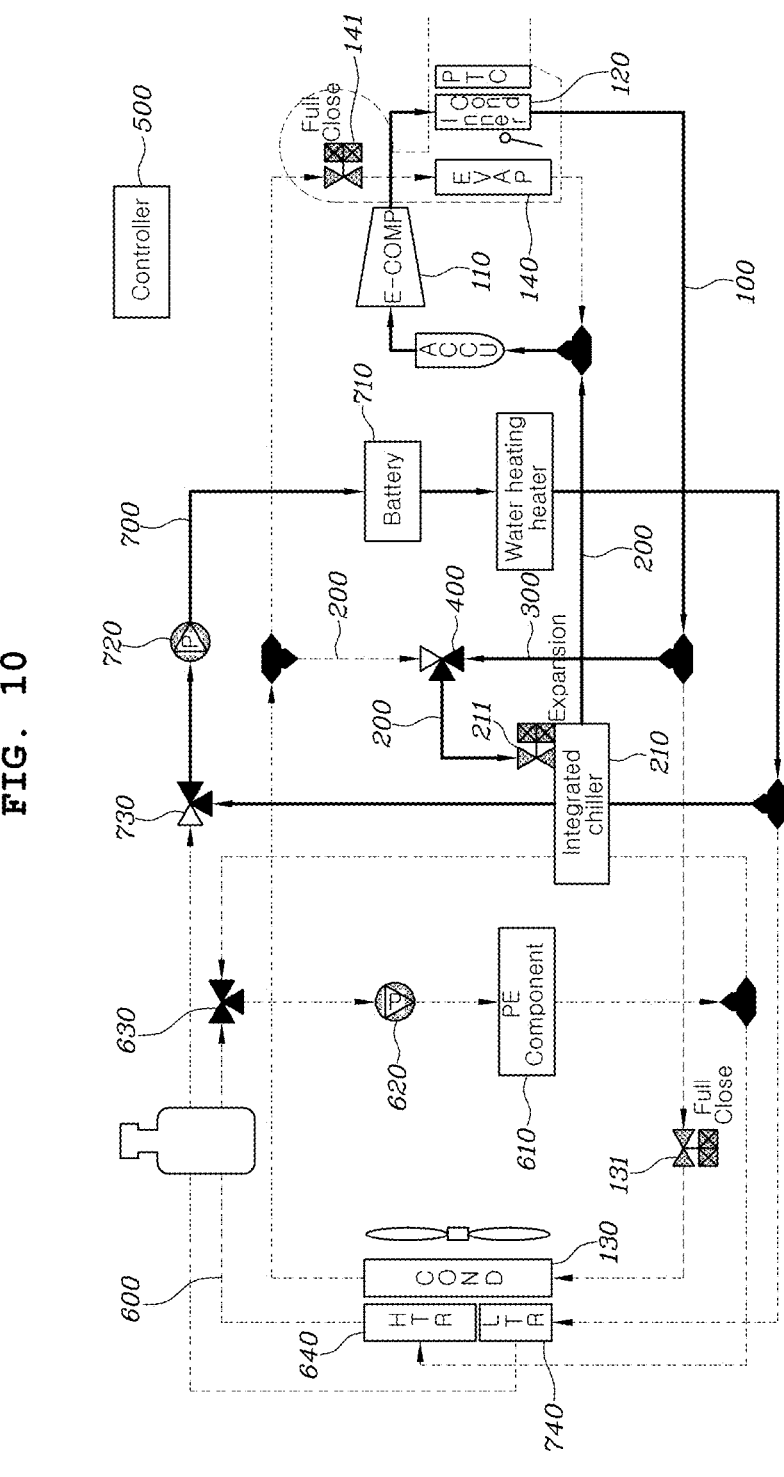

FIG. 8, FIG. 9 and FIG. 10 are circuit diagrams illustrating a heating control mode of the thermal management system for a vehicle according to various exemplary embodiments of the present disclosure.

With further reference to FIG. 8, FIG. 9 and FIG. 10, in the heating control mode of the thermal management system for a vehicle according to various exemplary embodiments of the present disclosure, the heat from the outside air, the waste heat of the electric parts 610, or the waste heat of the battery 710 may be absorbed, being radiated from the indoor condenser 120.

As shown in FIG. 8, the room may be heated by absorbing heat from the outside air in an external air endothermic heating mode. In the external air endothermic heating mode, the controller 500 may control the compressor 110 to drive, circulating the refrigerant to the base refrigerant flow path 100, may control at the same time the first expansion valve 131 to expand the refrigerant flowing into the external condenser 130, may control the second expansion valve 141 to block the refrigerant flowing into an upstream point of the evaporator 140, may control the control valve 400 so that the refrigerant flows from the downstream point of the external condenser 130 to the chiller refrigerant flow path 200, and may control the third expansion valve 211 to be in full open.

Furthermore, as shown in FIGS. 9 to 10, in an waste heat absorption mode, the controller 500 may control the control valve 400 so that the refrigerant of the base refrigerant flow path 100 flows into the chiller refrigerant flow path 200 through the parallel refrigerant flow path 300, may control the first expansion valve 131 or the second expansion valve 141 so that the incoming refrigerant is blocked, and may control the third expansion valve 211 so that the refrigerant incoming to the upstream point of the integrated chiller 210 expands.

As shown in FIG. 9, in an electric part waste heat absorption mode, the controller 500 may control the compressor 110 to drive so that the refrigerant is circulated to the base refrigerant flow path 100 and may control the control valve 400 so that the refrigerant of the base refrigerant flow path 100 flows into the integrated chiller 210 through the parallel refrigerant flow path 300 and the chiller refrigerant flow path 200. Furthermore, the controller 500 may control the first expansion valve 131 and the second expansion valve 141 to be blocked and the third expansion valve 211 so that the refrigerant flowing into the integrated chiller 210 expands, and while controlling the electric part valve 630 so that the coolant that has passed through the electric parts 610 flows into the integrated chiller 210, may control the electric pump 620 to drive at the same time so that the coolant is circulated in the electric part cooling flow path 600.

As shown in FIG. 10, in a battery waste heat absorption heating mode, the controller 500 may control the compressor 110 to drive so that the refrigerant is circulated to the base refrigerant flow path 100 and may control the control valve 400 so that the refrigerant of the base refrigerant flow path 100 flows into the integrated chiller 210 through the parallel refrigerant flow path 300 and the chiller refrigerant flow path 200. Furthermore, the controller 500 may control the first expansion valve 131 and the second expansion valve 141 to be blocked and the third expansion valve 211 so that the refrigerant flowing into the integrated chiller 210 expands, and while controlling the battery valve 730 so that the coolant that has passed through the battery 710 flows into the integrated chiller 210, may control the electric pump 720 to drive at the same time so that the coolant is circulated in the battery cooling flow path 700.

The, the thermal management system for a vehicle according to an exemplary embodiment of the present disclosure may be controlled in the control mode in which two or more combinations of the external air endothermic heating mode, the electric part waste heat absorption heating mode, the battery waste heat absorption heating mode, and the like are combined.

Figure 11:
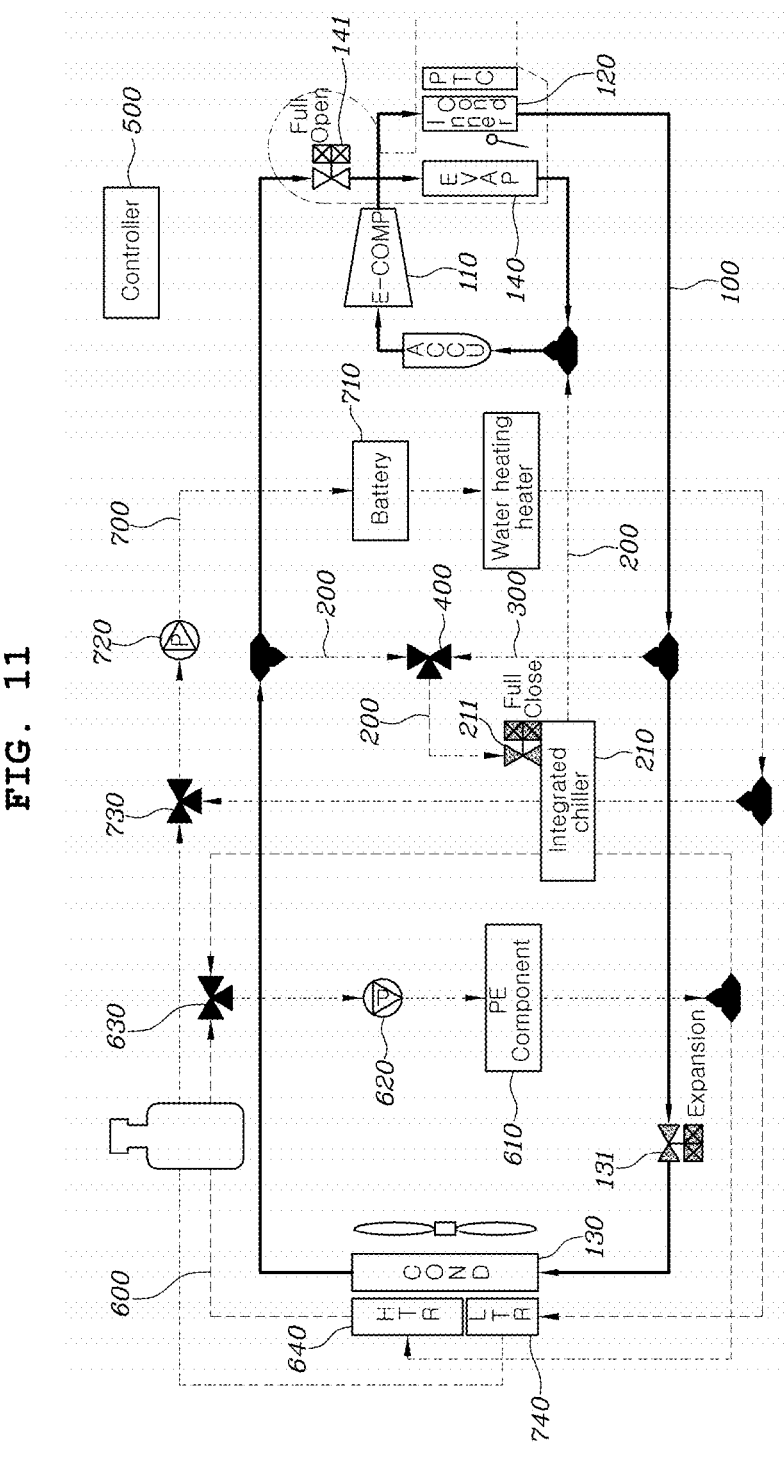
FIG. 11 is a circuit diagram illustrating an external air endothermic dehumidification mode of the thermal management system for a vehicle according to various exemplary embodiments of the present disclosure.

FIG. 11 is a circuit diagram illustrating an external air endothermic dehumidification mode of the thermal management system for a vehicle according to various exemplary embodiments of the present disclosure.

With further reference to FIG. 11, in an external air heat absorption and dehumidification mode, the controller 500 may control the first expansion valve 131 so that the refrigerant flowing into the upstream point of the external condenser 130 expands and may control the third expansion valve 211 so that the refrigerant to the integrated chiller 210 is blocked.

The controller 500 may control the compressor 110 to drive, circulating the refrigerant to the base refrigerant flow path 100, may control the second expansion valve 141 to be fully open, and accordingly, the refrigerant may absorb heat from the outside air and indoor air. Furthermore, the controller 500 may control the third expansion valve 211 to be blocked so that, accordingly, the refrigerant in the base refrigerant flow path 100 does not flow into the chiller refrigerant flow path 200 or the parallel refrigerant flow path 300.

Figure 12:
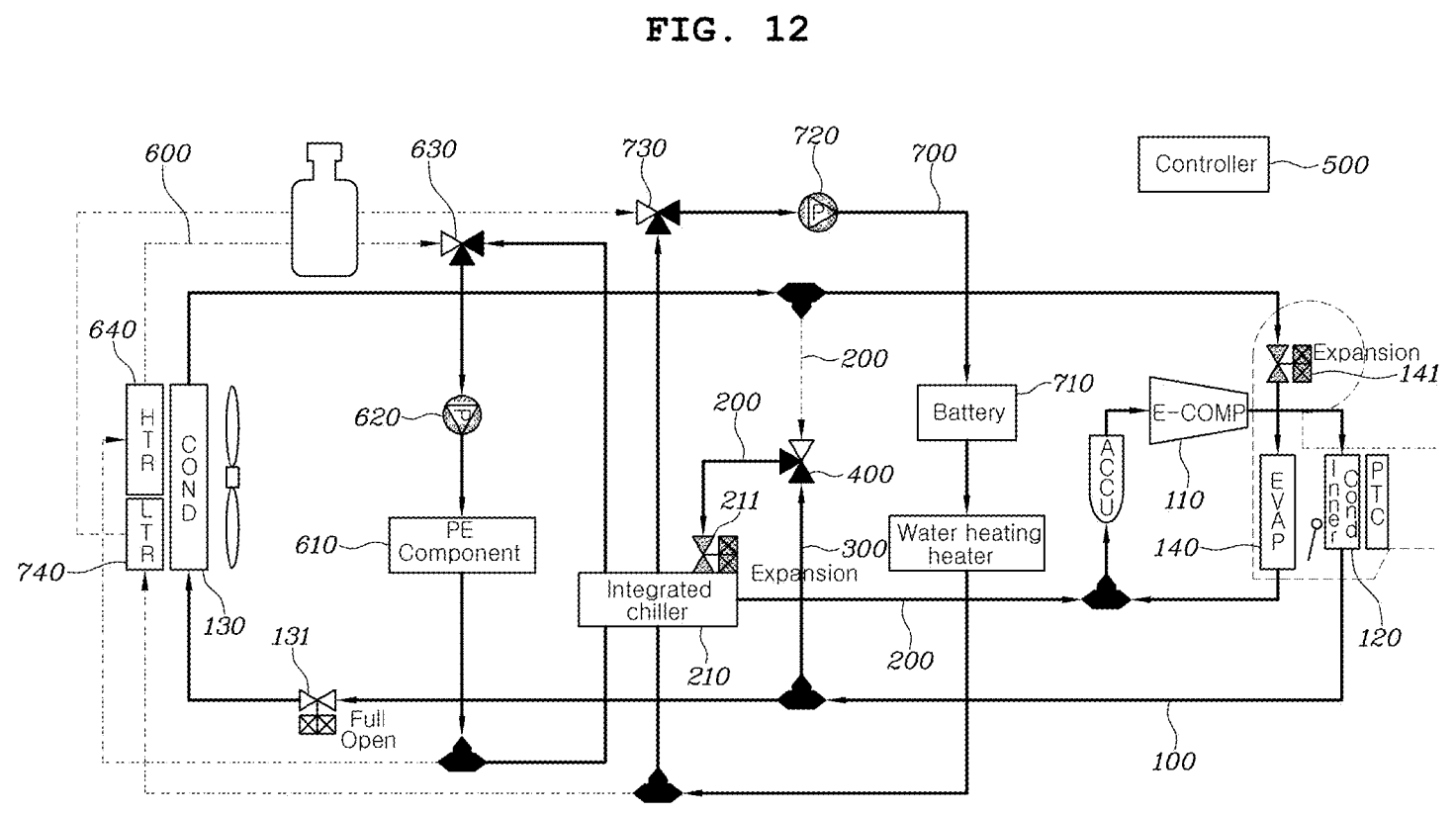

FIG. 12 is a circuit diagram illustrating a waste heat absorption and dehumidification mode of the thermal management system for a vehicle according to various exemplary embodiments of the present disclosure.

With further reference to FIG. 12, in a waste heat absorption and dehumidification mode, the controller 500 may control the control valve 400 so that the refrigerant of the base refrigerant flow path 100 flows into the chiller refrigerant flow path 200 through the parallel refrigerant flow path 300, may control the second expansion valve 141 so that the refrigerant flowing into the evaporator 140 expands, and may control the third expansion valve 211 so that the refrigerant flowing into the upstream point of the integrated chiller 210 expands.

The controller 500 may control the compressor 110 to drive so that the refrigerant is circulated to the base refrigerant flow path 100, may control the control valve 400 so that the refrigerant of the base refrigerant flow path 100 flows into the chiller refrigerant flow path 200 through the parallel refrigerant flow path 300 at the upstream point of the external condenser 130, and may control the first expansion valve 131 at the same time so that the refrigerant flowing into the upstream point of the external condenser 130 through the base refrigerant flow path 100. Furthermore, the controller 500 may control the second expansion valve 141 so that the refrigerant flowing into the evaporator 140 expands, absorbing the waste heat from the integrated chiller 210, and may control the third expansion valve 211 at the same time so that the refrigerant flowing into the upstream point of the integrated chiller 210 expands, cooling the room. Furthermore, the refrigerant compressed at high temperature/high pressure in the compressor 110 may flow into the indoor condenser 120, heating the room, and a dehumidification mode in which indoor heating and cooling occur at the same time may be implemented.

Furthermore, while controlling the electric part valve 630 so that the coolant that has passed through the electric parts 610 flows into the integrated chiller 210, the controller 500 may at the same time the electric pump 620 control to drive so that the coolant is circulated in the electric part cooling flow path 600, and while controlling the battery valve 730 so that the coolant that has passed through the battery 710 flows into the integrated chiller 210, may control the battery pump 720 to drive at the same time so that the coolant is circulated in the battery cooling flow path 700.

Figure 13:
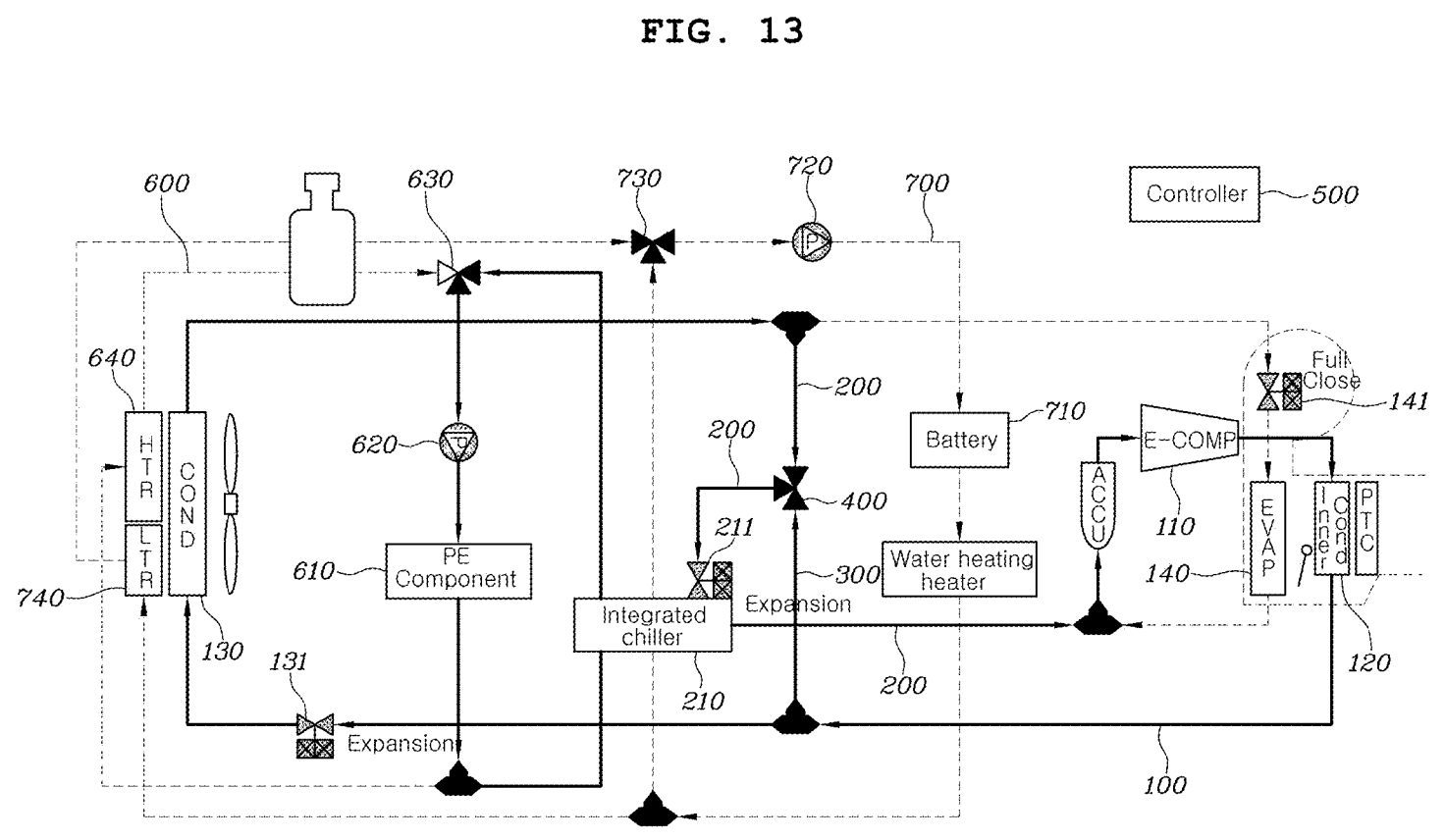

FIG. 13 is a circuit diagram illustrating an electrical component waste heat absorption and external air endothermic heating mode of the thermal management system for a vehicle according to various exemplary embodiments of the present disclosure.

With further reference to FIG. 13, in a waste heat absorption and external air endothermic heating mode, the controller 500 may control the control valve 400 so that the refrigerant of the base refrigerant flow path 100, while flowing into the external condenser 130, flows into the chiller refrigerant flow path 200 at the same time through the parallel refrigerant flow path 300, may control the first expansion valve 131 so that the refrigerant flowing into the external condenser 130 expands, and may control the third expansion valve 211 so that the refrigerant flowing into the upstream point of the integrated chiller 210 expands.

The controller 500 may control the compressor 110 to drive so that the refrigerant is circulated to the base refrigerant flow path 100, may control the control valve 400 so that the refrigerant of the base refrigerant flow path 100 flows into the chiller refrigerant flow path 200 through the parallel refrigerant flow path 300 at an upstream point of the external condenser 130 and may control the control valve 400 so that the refrigerant of the base refrigerant flow path 100 flows into the chiller refrigerant flow path 200 at the downstream point of the external condenser 130. Here, the control valve 400 may be a valve configured for controlling the flow rate and may control the flow rate, between the refrigerants of the base refrigerant flow path 100 flowing at the upstream point and the downstream point of the external condenser 130, respectively, to flow into the integrated chiller 210 and the third expansion valve 211.

At the same time, the controller 500 may control the first expansion valve 131 so that the refrigerant flowing into the external condenser 130 through the base refrigerant flow path 100 expands and may control the second expansion valve 141 to be blocked, and may control the third expansion valve 211 so that the refrigerant flowing into the upstream point of the integrated chiller 210 expands.

Furthermore, as shown, when absorbing electric part waste heat, while controlling the electric part valve 630 so that the coolant that has passed through the electric parts 610 flows into the integrated chiller 210 and the controller 500 may control the electric pump 620 to drive at a same time so that the coolant is circulated in the electric part cooling flow path 600.

In another exemplary embodiment of the present disclosure, when absorbing battery waste heat, while controlling the battery valve 730 so that the coolant that has passed through the battery 710 flows into the integrated chiller 210, the controller 500 may control the battery pump 720 to drive at the same time so that the coolant is circulated in the battery cooling flow path 700.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A thermal management system for a vehicle, the system comprising:

a base refrigerant flow path provided sequentially with a compressor, a second expansion valve, an indoor condenser, a first expansion valve, an external condenser, and an evaporator and configured to flow a refrigerant in the base refrigerant flow path;

a chiller refrigerant flow path branched off from the base refrigerant flow path at a downstream point of the external condenser, provided sequentially with a third expansion valve and an integrated chiller, and merged with the base refrigerant flow path at an upstream point of the compressor;

a parallel refrigerant flow path branched off from the base refrigerant flow path at an upstream point of the first expansion valve and a downstream point of the indoor condenser and merged with the chiller refrigerant flow path at an upstream point of the third expansion valve; and a first bypass path connected between a portion of the chiller refrigerant flow path and a portion of the base refrigerant flow path by bypassing the evaporator, wherein a first end portion of the first bypass path is connected to the portion of the chiller refrigerant flow path between a control valve and the evaporator and a second end portion of the first bypass path is connected to the portion of the base refrigerant flow path between the second expansion valve and the evaporator by bypassing the evaporator, and wherein the control valve is connected to a junction portion between the parallel refrigerant flow path and the chiller refrigerant flow path.

2. The system of claim 1, wherein the integrated chiller is provided to be configured for exchanging heat at a same time with a coolant of a battery cooling flow path configured to cool a battery provided in the battery cooling flow path and a coolant of an electric part cooling flow path configured to cool electric parts.

3. The system of claim 2, further including a second bypass path connected to a battery valve mounted in the battery cooling flow path, the integrated chiller and a portion of the battery cooling flow path by bypassing the battery.

4. The system of claim 2, further including a third bypass path connected to an electric part valve mounted in the electric part cooling path and a portion of the electric part cooling path by bypassing the integrated chiller, wherein the electric parts are provided in the third bypass path.

5. The system of claim 4, wherein the electric part valve is configured to control the coolant passing through the electric parts to selectively flow to an electric part radiator mounted in the electric part cooling path, through the third bypass path or through the integrated chiller.

6. The system of claim 1, further including:

the control valve, which is provided at a point where the chiller refrigerant flow path branches off from the base refrigerant flow path or the chiller refrigerant flow path merges with the base refrigerant flow path or is provided at a point where the parallel refrigerant flow path branches off from the base refrigerant flow path or merges with the base refrigerant flow path or the chiller refrigerant flow path and is configured to control the flow of the refrigerant.

7. The system of claim 6, further including:

a controller electrically connected to the control valve and configured to control the control valve so that the refrigerant of the base refrigerant flow path flows or is blocked to the chiller refrigerant flow path or the parallel refrigerant flow path or to control the first expansion valve, the second expansion valve, or the third expansion valve so that the incoming refrigerant flows, is blocked, or expands.

8. The system of claim 7, wherein the control valve is a three-way valve which is provided at the point where the parallel refrigerant flow path merges with the chiller refrigerant flow path and is configured to control the flow of the refrigerant.

9. The system of claim 7, wherein, in an external air heat absorption and dehumidification mode, the controller is configured to control the first expansion valve so that the refrigerant flowing into the upstream point of the external condenser expands and configured to control the third expansion valve so that the refrigerant incoming to the integrated chiller is blocked.

10. The system of claim 7, wherein, in an electric part waste heat absorption mode, the controller is configured to control the control valve so that the refrigerant of the base refrigerant flow path flows into the chiller refrigerant flow path through the parallel refrigerant flow path, configured to control the first expansion valve or the second expansion valve so that the incoming refrigerant is blocked, and configured to control the third expansion valve so that the refrigerant incoming to the upstream point of the integrated chiller expands.

11. The system of claim 7, wherein, in a waste heat absorption and dehumidification mode, the controller is configured to control the control valve so that the refrigerant of the base refrigerant flow path flows into the chiller refrigerant flow path through the parallel refrigerant flow path, configured to control the second expansion valve so that the refrigerant flowing into the evaporator expands, and configured to control the third expansion valve so that the refrigerant flowing into the upstream point of the integrated chiller expands.

12. The system of claim 7, wherein, in a waste heat absorption and external air endothermic heating mode, the controller is configured to control the control valve so that the refrigerant of the base refrigerant flow path, while flowing into the external condenser, flows into the chiller refrigerant flow path at a same time through the parallel refrigerant flow path, configured to control the first expansion valve so that the refrigerant flowing into the external condenser expands, and configured to control the third expansion valve so that the refrigerant flowing into the upstream point of the integrated chiller expands.

* * * * *